(No Model.)

N. TESLA.
ELECTROMAGNETIC MOTOR.

No. 524,426. Patented Aug. 14, 1894.

WITNESSES:
Frank E. Hartley
Frank B. Murphy

INVENTOR
Nikola Tesla
BY
Duncan, Curtis & Page
ATTORNEYS.

UNITED STATES PATENT OFFICE.

NIKOLA TESLA, OF NEW YORK, N. Y., ASSIGNOR TO THE TESLA ELECTRIC COMPANY, OF SAME PLACE.

ELECTROMAGNETIC MOTOR.

SPECIFICATION forming part of Letters Patent No. 524,426, dated August 14, 1894.

Application filed October 20, 1888. Serial No. 288,677. (No model.)

*To all whom it may concern:*

Be it known that I, NIKOLA TESLA, a subject of the Emperor of Austria-Hungary, from Smiljan, Lika, border country of Austria-Hungary, and a resident of New York, in the county and State of New York, have invented certain new and useful Improvements in Electromagnetic Motors, of which the following is a specification, reference being had to the drawings accompanying and forming a part of the same.

In previous patents of the United States notably in those numbered 381,968 and 382,280, dated May 1, 1888, I have shown and described a system of transmitting power by means of electro-magnetic generators and motors. The distinguishing feature of this system was shown to be the progressive movement or shifting of the magnetic poles or points of maximum attraction of a motor, due to the action or effect of alternating currents passed through independent energizing circuits in the motor. To secure this result the two currents must have different phases, the best results being obtained when the two currents differ by a quarter phase, or in other words when the periods of maximum potential of one current coincide with the minimum periods of the other, and conversely. I have also discovered that a single alternating current may be utilized to produce a progression or shifting of the magnetic poles of a motor if the field magnets of the same be of different magnetic susceptibility in different parts so that the magnetic phases of the same will differ. That is to say, if the field magnets are of such character that their different portions will be differently magnetized—in respect to time—by the same current impulse, and so disposed that the difference of magnetic phase will maintain a rotary or progressive shifting of the points of maximum magnetic effect. This may be accomplished in various ways, as may best be explained by reference to the accompanying drawings, in which—

Figure 1:
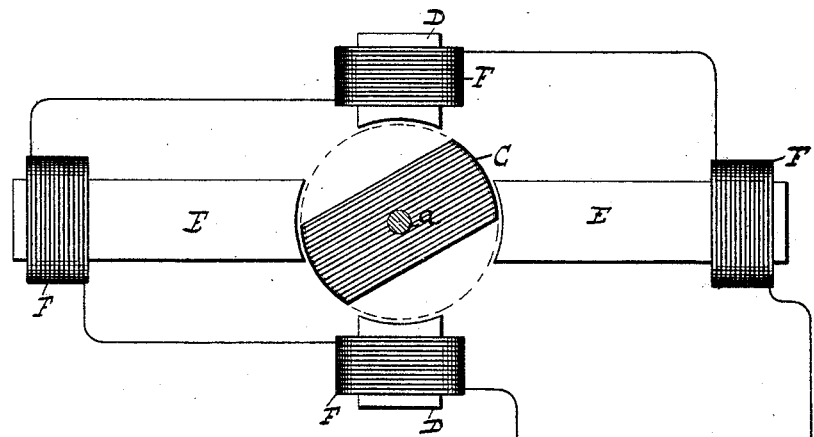
Figure 2:
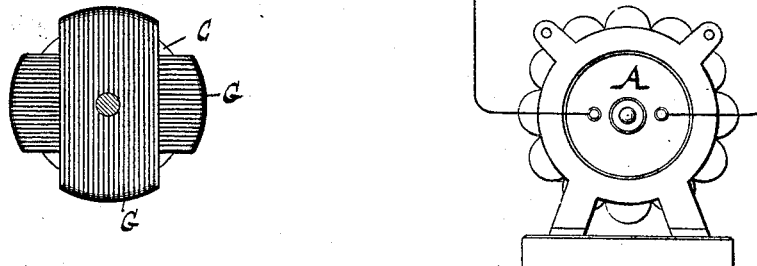

Figure 1, is a diagrammatic view of a motor constructed in accordance with my invention and a generator connected therewith. Fig. 2, is an end view of a modified form of armature for said motor.

Let A designate an ordinary type of alternating current generator in the circuit of which is to be connected a motor or motors, according to my present invention. I construct such motor or motors in the following manner: On a shaft $a$ I mount an armature C, which for convenience of illustration is presumed to be a soft iron plate or disk with two cut-away portions or a bar with rounded ends. Around this armature I place say four poles, D D E E, of soft iron, and, as is usual in all alternating current machines, built up of insulated plates or sections to prevent the heating that would otherwise occur. Each of these cores is surrounded by an energizing coil F and all of these coils are connected to the main circuit from the generator A in series or in any other manner to receive simultaneously the current impulses delivered by the generator. If the cores are all of the same shape or mass, or composition, and the coils are all wound in the same or alternately opposite directions, no rotation would be produced by the passage through the coils of a current, whether alternating or direct, since the attractive forces of the poles upon the soft iron armature would be developed simultaneously and would counterbalance or neutralize each other. But to secure rotation I make, for example, the cores D D short with their coils close to their inner ends and the cores E E long, with their coils removed from the inner ends. By this means I secure a difference in the magnetic phases which the poles exhibit, for while the short cores will respond to the magnetizing effect of an alternation or impulse of current in the coils in a certain time, a greater interval of time will elapse before the same magnetic intensity will be developed at the ends of the longer cores, and in practice I have found that this difference in phase may be utilized to produce the rotation of the armature. The effect being virtually to produce a shifting of the points of maximum magnetic effect similar to that which takes place when two alternating energizing currents, differing in phase are used, as explained in the patents above referred to. The essential difference being that in my patented system the rotation is effected by a time difference of electrical phase, while in the present case it is due to a difference in magnetic phases.

The same or similar results are obtainable by other means. For example, to secure the requisite difference of magnetic phase, I may make two of the cores as E E of greater mass than cores D D, whereby their period of saturation will be greater than of cores D D, or I may make the cores E E of hard iron or steel and the cores D D of soft iron, in which case the cores E E offering greater resistance to magnetic changes, will not exhibit their magnetism as soon after the passage of a current as the cores D D. Or if the cores of one set of poles, as D, D, be removed, the attractive force of the coils or solenoids would be exerted instantly while the magnetic cores E E would lag or have a different phase.

The special form of the motor is largely a matter of choice, nor is the invention limited to the number of poles nor to the special form of armature shown. For example, I may employ such an armature as that shown in Fig. 2, which is a cylinder or disk C wound with coils G closed upon themselves. This adds materially to the efficiency of the motor for the reason that currents are induced in the closed coils and magnetize the iron cylinder in a manner similar to that described in my Patent No. 383,279 of May 1, 1888.

Without limiting myself, therefore, in the particulars hereinbefore specified, what I claim as my invention is—

1. In an alternating current motor the combination with energizing coils adapted to be connected with an external circuit of cores of different magnetic susceptibility so as to exhibit differences of magnetic phase under the influence of an energizing current, as herein set forth.

2. The combination in an alternating current motor with a rotary armature of magnetic poles, and coils adapted to be connected with the external circuit surrounding the same, the said cores being constructed of different size or material whereby their magnetic phase will differ in time as set forth.

3. The combination in an electro magnetic motor with a rotary armature of magnetic cores of different length or mass and energizing coils surrounding the same and adapted to be connected with a single source of alternating currents, as set forth.

4. The combination in an electro magnetic motor with a rotary armature of short magnetic cores as D D and long magnetic cores as E E, and energizing coils surrounding the same, those on the cores E E being placed at a distance from the inner ends of the said cores, as herein set forth.

5. The combination in an electro-magnetic motor with energizing coils adapted to be connected with a source of alternating currents, and cores of different magnetic susceptibility, of an armature wound with coils closed upon themselves, as herein set forth.

6. The combination in an electro magnetic motor with a rotary armature of field cores of different magnetic susceptibility and energizing coils thereon connected in series and adapted to be connected with a source of alternating currents, as set forth.

NIKOLA TESLA.

Witnesses:
   GEO. N. MONRO,
   A. PATTERSON.